United States Patent
Bickson et al.

(10) Patent No.: US 7,478,366 B2
(45) Date of Patent: Jan. 13, 2009

(54) DEBUGGER AND METHOD FOR DEBUGGING COMPUTER PROGRAMS ACROSS MULTIPLE PROGRAMMING LANGUAGES

(75) Inventors: Maya Bickson, Jerusalem (IL); Eyal Alaluf, Jerusalem (IL)

(73) Assignee: Mainsoft R&D Ltd., Lod (IL)

( * ) Notice: Subject to any disclaimer, the term of this patent is extended or adjusted under 35 U.S.C. 154(b) by 818 days.

(21) Appl. No.: 10/947,431

(22) Filed: Sep. 22, 2004

(65) Prior Publication Data

US 2006/0064677 A1 Mar. 23, 2006

(51) Int. Cl.
*G06F 9/44* (2006.01)
(52) U.S. Cl. .............................. 717/124; 717/109; 703/6
(58) Field of Classification Search .................. 717/124
See application file for complete search history.

(56) References Cited

U.S. PATENT DOCUMENTS

| | | | | |
|---|---|---|---|---|
| 5,414,649 | A * | 5/1995 | Tse et al. .......................... | 703/6 |
| 6,353,923 | B1 * | 3/2002 | Bogle et al. ................... | 717/128 |
| 6,493,834 | B1 | 12/2002 | Bates et al. | |
| 6,637,024 | B1 * | 10/2003 | Johnson et al. ............... | 717/124 |
| 7,107,578 | B1 * | 9/2006 | Alpern ......................... | 717/124 |
| 7,203,925 | B1 * | 4/2007 | Michael et al. .............. | 717/109 |
| 7,203,926 | B2 * | 4/2007 | Bogle et al. .................. | 717/124 |
| 7,299,454 | B2 * | 11/2007 | Pugh et al. ................... | 717/125 |
| 2004/0031020 | A1 | 2/2004 | Berry et al. | |
| 2004/0059960 | A1 | 3/2004 | Jentsch et al. | |
| 2004/0059961 | A1 | 3/2004 | Jentsch et al. | |
| 2004/0083467 | A1 | 4/2004 | Hanley et al. | |
| 2004/0123271 | A1 * | 6/2004 | Bindewald et al. .......... | 717/124 |

OTHER PUBLICATIONS

"Investigating Multilanguage Debugging and the New IDEs of Visual Studio 97" May 1997 by Rober Schmidt.*

* cited by examiner

*Primary Examiner*—Wei Y Zhen
*Assistant Examiner*—Phillip H Nguyen
(74) *Attorney, Agent, or Firm*—Myers Wolin, LLC

(57) ABSTRACT

A debugger and method for debugging computer programs across multiple programming languages are provided. The debugging is performed at a source level of a computer program written in any programming language supported by the .Net® platform, while the program is executed over a Java runtime environment. The debugger disclosed provides a call stack display and an expression evaluator. Furthermore, the debugger allows software developers to step through Java source code and follow the execution flow of the Java program. One exemplary embodiment of the disclosed debugger is an extension of the Microsoft® Visual Studio .Net®.

97 Claims, 4 Drawing Sheets

DEBUGGER AND METHOD FOR DEBUGGING COMPUTER PROGRAMS ACROSS MULTIPLE PROGRAMMING LANGUAGES

FIELD OF THE INVENTION

The present invention relates generally to debuggers and methods for debugging computer programs, and more particularly to a debugger and a method for debugging computer programs across multiple programming languages.

BACKGROUND OF THE INVENTION

The Microsoft.Net® framework is a new platform for building integrated, service-oriented, applications to meet the needs of today's and future Internet businesses. The .Net platform allows developers to take better advantage of technologies than any earlier Microsoft® platform. A .Net® application can be executed on any platform that supports the .Net® common language runtime (CLR). It is further possible that a version of the CLR be built for platforms other than Windows. The .Net® platform allows different programming languages to be integrated with one another. For example, it is possible to create a class in C++ that is derived from a class implemented in Visual Basic. The programming languages supported by the .Net platform include, but are not limited to, C++ with managed extensions, C-sharp (C#), Visual Basic, Pascal, COBOL, and many others. In order to allow the execution of these programming languages by the CLR, their source code compiled into Microsoft® intermediate language (MSIL) bytecodes.

The Java programming environment provided by Sun Microsystems® has recently gained popularity. The Java programming language is a language that is designed to be portable enough so that it can be executed on a wide range of computers, ranging from small devices (e.g., cell phones and smart cards) up to supercomputers. Computer programs written in the Java programming language are compiled into Java bytecode instructions that are suitable for execution over a Java virtual machine (JVM).

New technologies have been developed to bridge the gap between the Java and the .Net® environments. Specifically, these technologies provide a compiler (hereinafter: the "IL2J compiler") that compiles MSIL bytecodes into Java bytecodes, and thus allowing to execute software programs developed using the .Net framework over a JVM. This is performed by resolving semantic differences at compilation time and at runtime. An example for the intermediate language to Java (IL2J) compiler is disclosed in U.S. patent application Ser. No. 10/437,518 entitled "Compiler and Software Product for Compiling Intermediate Language Bytecodes into Java Bytecodes" assigned to common assignee and incorporated herein by reference for all that it contains.

However, when developing a computer program, debugging of the program code is one of the most difficult and time consuming tasks. Debugging of a computer program is often performed by means of debugging software (or "debugger"). The debugger detects a portion of a program that causes failures during execution, sets breakpoints in places in the program code that are of interest in respect of the status of certain variables, and executes the program code. When executing the debugger, a run-time environment of the program developing environment starts executing the program code, stops its execution when reaching the first breakpoint in the order of execution, and usually displays the content of the variables or expression for analysis. Also, a debugger can execute the program in a certain flow (e.g., step-by-step) and to display the stack content of the executed program.

To debug a program code produced by the IL2J compiler, there is a need for a debugger that finds failures in Java code using a set of debugging commands issued by a .Net® debugger. That is, such a debugger has to set breakpoints places in the .Net program code such that they appear at the appropriate location in the resultant Java code, translates .Net expressions to be evaluated to Java expressions, and translates the evaluated expression back to .Net® notation. Furthermore, such a debugger should support the debugging of multiple languages included the .Net® framework and to allow software developers to step through Java source code and follow the execution flow of the Java program.

In US Pat. Application No. 20040059961, Jentsch et al, disclose methods and systems for debugging a computer program code by using debugging software.

Software means may be provided for causing the debugging software to stop at a breakpoint set in the computer program code. In one embodiment disclosed by Jentsch, a method is provided that comprises making the debugging software stop at a breakpoint based on one or more predefinable conditions.

Bogle et al, in U.S. Pat. No. 6,353,923, Active Debugging Environment for Debugging Mixed-Language Scripting Code, assigned to MicroSoft®, teaches an active debugging environment for debugging a virtual application that contains program language code from multiple compiled and/or interpreted programming languages. The active debugging environment is language neutral and host neutral, where the host is a standard content centric script host with language engines for each of the multiple compiled and/or interpreted programming languages represented in the virtual application.

The active debugging environment user interface can be of any debug tool interface design. The language neutral and host neutral active debugging environment is facilitated by a process debug manager that catalogs and manages application specific components, and a machine debug manager that catalogs and manages the various applications that comprise a virtual application being run by the script host. The process debug manager and the machine debug manager act as an interface between the language engine specific programming language details and the debug user interface. Thus, MicroSoft® provides a debugger for debugging virtual applications, where the code of these applications is the code that is being debugged.

It would therefore be advantageous to provide a debugger that debugs computer program at a source level code, written in any programming language supported by the .Net® platform, while the program is running on a Java virtual machine (JVM). It would be further advantageous if the provided debugger operates as part of an existing integrated development environment (IDE) tool. Further, it would be advantageous to provide a debugger for debugging applications written in one of the .Net programming languages (VB, C#, etc.) where the application code is executed over a Java runtime, i.e., where the resultant programming code being debugged is written in Java.

SUMMARY OF THE INVENTION

Accordingly, it is a principal object of the present invention to provide a debugger and a method that debugs computer program at the source level code, written in any programming language supported by the .Net® platform.

It is another object of the present invention to provide a debugger and a method for debugging applications while the program is running on a Java virtual machine (JVM).

It is a further object of the present invention to provide a debugger and a method for debugging applications wherein the debugger operates as part of an existing integrated development environment (IDE) tool.

It is a still further object of the present invention to provide a debugger and a method for debugging applications written in one of the .Net programming languages (VB, C#, etc.), where the application code is executed over a Java runtime, i.e., where the resultant programming code being debugged is written in Java.

A debugger is provided for debugging a computer program across multiple programming languages, wherein the debugging is performed on .Net® platform source code of the computer program, while the computer program is executed within a Java runtime environment. The debugger includes an integrated development environment (IDE) interface capable of interfacing with at least one IDE tool for the purpose of receiving a plurality of debugging commands, each having at least one parameter. The debugger also includes a debug engine capable of determining a current breakpoint location in the source code, a Java debugger interface (JDI) capable of communicating with at least one Java debugger, a convert engine capable of converting the parameters of each of the debugging commands from a .Net® compliant format to a Java compliant format, the convert engine being further capable of converting the debugging commands from the Java compliant format in Java source code to the .Net® compliant format. The debugger further includes an expression evaluator capable of at least parsing expressions and a debug information repository at least comprising debug information. The convert engine implements at least a conversion algorithm designed to bridge the semantic differences between .Net® programming languages and the Java programming language and the debugging is performed at a source level of the computer program written in any programming language supported by the .Net platform.

A debugger and method is disclosed for debugging computer programs across multiple programming languages. The debugging is performed at a source level of a computer program written in any programming language supported by the .Net® platform, while the program is executed over a Java runtime environment. The debugger disclosed provides a call stack display and an expression evaluator. Furthermore, the debugger allows software developers to step through both .Net® and Java source code and follow the execution flow of the Java program. In one embodiment of the disclosed debugger is an extension of the Microsoft® Visual Studio .Net®.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
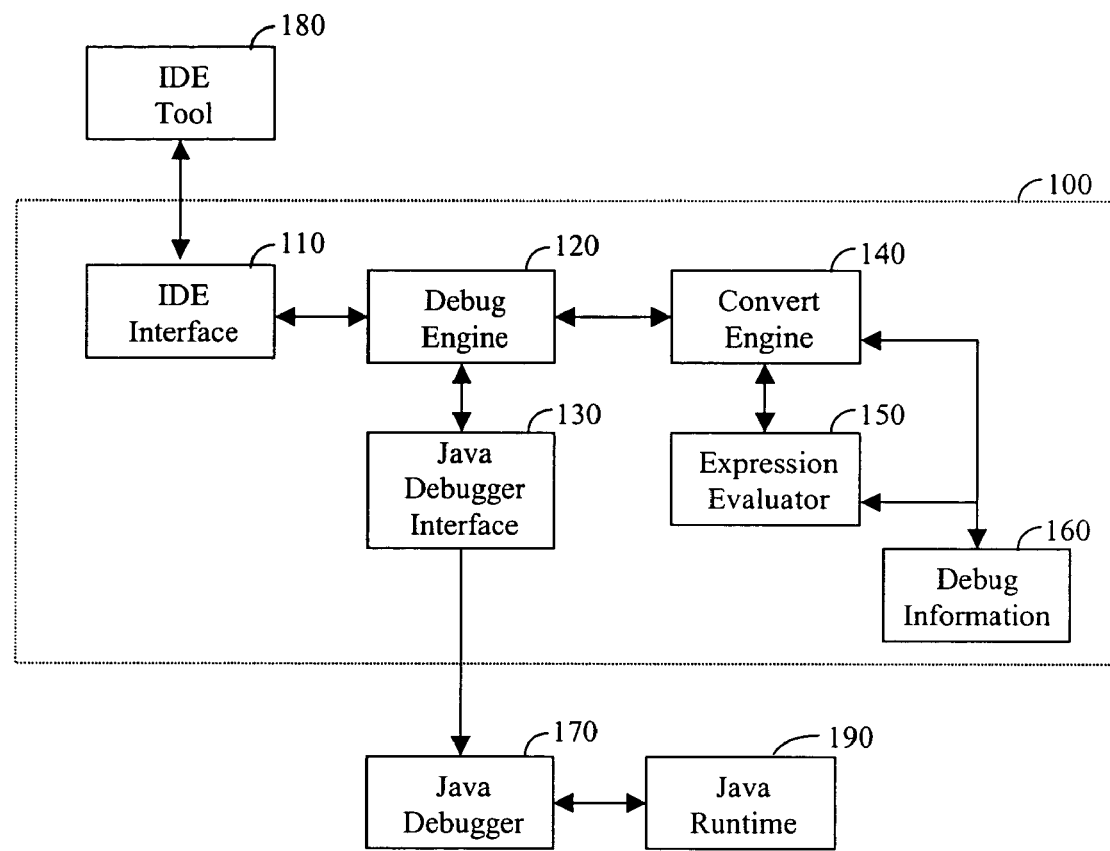
FIG. 1 is a diagram of a debugger, constructed in accordance with an exemplary embodiment of the present invention.

Referring now to FIG. 1, an exemplary block diagram of a debugger 100, constructed in accordance with the present invention is shown. Debugger 100 includes an integrated development environment (IDE) interface 110 for interfacing with an IDE tool 180, a debug engine 120, a Java debugger interface (JDI) 130, a convert engine 140, an expressions evaluator 150 and a debug information repository 160. IDE interface 110 receives a plurality of debugging commands issued by the user of IDE tool 180, and replies back with the debugging results. The debugging commands include, but are not limited to: setting a breakpoint, moving to the next step, evaluating expressions, showing stack frame information, and so on. In one embodiment of this invention, IDE tool 180 is the Microsoft Visual Studio .Net® development tool. In this exemplary embodiment, the Visual Studio sends the debugging commands via COM, and IDE interface 110 replies using application programming interface (API) callbacks supplied by the Visual Studio. Visual Studio® is a popular development tool used by software developers. It provides, among other features, an editor for the .Net languages and a .Net debugger that enables enhanced runtime debugging capabilities. In order to be fully integrated with the Visual Studio, debugger 100 preferably supports the debugging capabilities provided by the Visual Studio®.

Debug engine 120 is capable of communicating with a plurality of different types of debuggers, each of which is targeted to a different programming language. For example, debug engine 120 may communicate with a Java debugger, a remote C++ debugger, and the like. Furthermore, debug engine 120 determines the current stopping location of IDE tool 180. For that purpose the debug engine 120 holds the state of the running program, i.e., the running threads, the stack frame information, and the breakpoints that were set in the program. It should be noted that the debug engine does not execute the commands, but rather passes them to JDI 130.

JDI 130 implements Java specific debugger logic, allowing communication with Java debugger 170. Java debugger 170 is actually used to debug the Java bytecodes produced by the IL2J compiler. Java debugger 170 may be, for example, a command line Java Debugger (JDB). JDI 130 translates the commands received from debug engine 120 to commands compliant with Java debugger 170 and translates its output to a format compliant with debug engine 120. Java debugger 170 executes the Java code over a Java runtime environment 190, such as a J2EE application server or a Java virtual machine (JVM).

Convert engine 140 is responsible for bridging between the .Net® code and the Java code. Specifically, convert engine 140 converts breakpoint locations and .Net expressions, which are to be evaluated, from a .Net compliant format to a Java compliant format. Furthermore, it translates stack frame information received from Java compiler to .Net®. Convert engine 140 implements at least a conversion algorithm designed to bridge the semantic differences between .Net® programming languages and Java programming language, such as passing parameters by reference and unsigned variables. The conversion algorithm is used by the IL2J complier and described in greater detail in the above referenced Ser. No. 10/437,518 application. Convert engine 140 is a corner stone of the present invention, and its activities are further described below.

Expression evaluator 150 uses data in debug information repository 160 to gather information including, but not limited to, local variables, as well as a list of members of each variable that is to be displayed when expanding the view of the variable in one of the windows. Expression evaluator 150 must be further adequate to parse incoming .Net® expressions to derive atomic elements (i.e., operators and operands) of the expressions. Specifically, expression evaluator 150 parses any .Net® expression written in a programming language including, but not limited to, C++ with managed extensions, C-sharp (C#), Visual Basic, Pascal, COBOL and many others.

Debug information repository 160 includes debug information extracted from at least program database (PDB) files and dynamically linked library (DLL) files produced by the .Net® framework and extensible markup language (XML) files produced by the IL2J compiler during compilation. The DLL files include information on implemented types in the .Net® program, the description of each type, the methods each type implements as well as its properties and members. The DLL files further include the types of the local variables in each implemented method.

For each source file the PDB files include its name and code lines, and the location of its classes and methods. The PDB files also contain the local variables' names included in the methods of a source file. The XML files comprise information that is only available during the compilation process of the .Net® code. For example, a XML file includes a list of local variables that are passed by reference to a method and a conversion table for converting .Net® line, column and offset to Java offset. The debug information is used for finding a location (i.e., a specific code line) of a certain class or function, finding a Java offset of a .Net® line and column, identifying the names and types of local variables, identifying the list of members of a certain type and so on.

The following are exemplary flowcharts describing some of the main functions of debugger 100.

Figure 2:
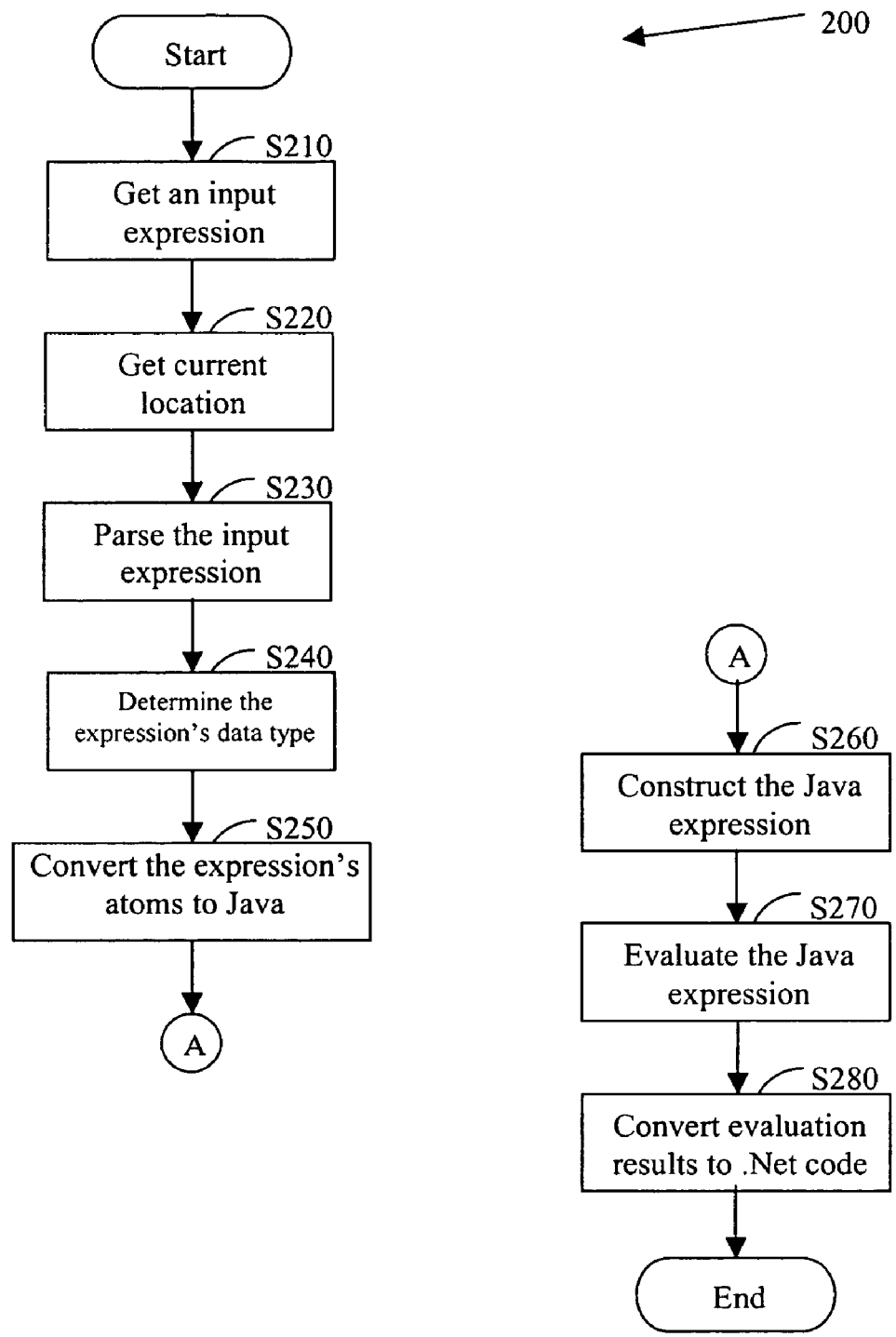
FIG. 2 is a flowchart describing the method for evaluating expressions, constructed in accordance with an exemplary embodiment of this invention.

FIG. 2 is a flowchart 200 describing the method for evaluating expressions in accordance with an exemplary embodiment of the present invention. The method disclosed evaluates all expression types defined by the programming languages supported by the .Net® framework including, but not limited to, identifiers of various types (e.g., objects, primitives, arrays), literals, operators (e.g., unary, binary, arithmetic, logical, overloaded), member lookup (e.g., properties and fields), function calls and others.

At step S210, an expression to be evaluated is received as input at IDE interface 110. The expression is written in one of the .Net® programming languages. At step 220, the current break point location of debugger 100 is retrieved from debug engine 120. The location is the context in which the expression is to be evaluated. For example, in a line number '100' a variable 'j' may be a local variable of type integer and in a line '150' a variable with the same name 'j' may be a field of string type.

At step S230, convert engine 140 uses expression evaluator 150 to parse the expression to be evaluated. Expression evaluator 150 provides a tree representation of the expression, where each node in the tree is an operator and the leaves of the tree are operands.

Figure 3:
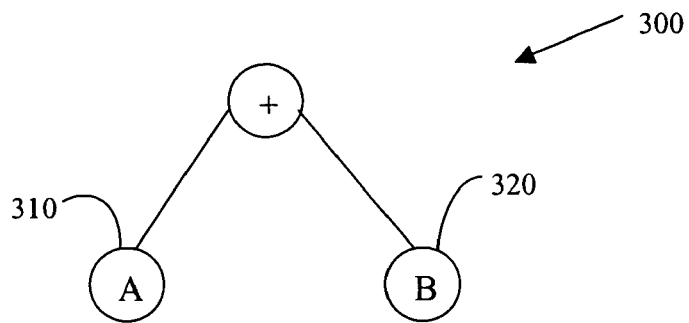
FIG. 3 is a tree representation of a .Net® expression, constructed in accordance with an exemplary embodiment of the present invention.

FIG. 3 shows an exemplary tree representation 300 of the expression "A+B." The tree is created using debug information repository 160, which gathers debug information regarding the atomic elements of the input expression. For each atomic element of the expression, it is determined whether the expression is a local variable, a member, a property, a function, an array or any other data type. Referring again to FIG. 2, the determination is made in the current context (calculated in step S220). For example, to evaluate a variable 'c', the data type of variable 'c' is determined by first checking if it is a local variable, and if not checking whether variable 'c' is a member, i.e., a field, a function, or a property of the current class. The method determines the type of each atomic element in order to build the parsed expression tree.

At step S240, convert engine 140 traverses the tree for the purpose of determining the expression type. For example, for the expression "A+B" in FIG. 3, if the variables A (310) and B (320) are both integers, then the expression type is also an integer. At step S250, convert engine 140 transforms each element of the tree representation into a Java code. Specifically, for each tree element (i.e., atomic element) convert engine 140 determines whether or not a conversion of the element to a Java compliant format is required. If such conversion is required, convert engine 140 replaces it with an element that can be handled by Java debugger 170; otherwise, the element is left without any modification.

The following are some non-limiting examples for handling elements that are not compliant with the Java language or elements that require adaptation to the Java code produced by the IL2J compiler. The Java programming language (as opposed to the .Net® platform) does not support attributes such as the passing of variables by reference and unsigned variables. For variables passed by reference to a function, convert engine 140 creates another local variable having a different name (e.g., x_byref), which is a boxing of the original variable (e.g., x). When evaluating the original variable (e.g., x) the expression is replaced by x_byref.getValue().

Unsigned variables are not supported by the Java programming language. For example, Byte type represents unsigned 8-bit integers with values between 0 and 255. The corresponding 8-bit type in Java is a signed variable, and thus can hold integers with values between −128 and 127. To display the correct value of an unsigned variable of a Byte type (e.g., x), convert engine 140 masks the variable 'x' with the binary value '255', i.e., the expression to be evaluated is replaced with the expression 'x&255'. When evaluating an array of unsigned variables (e.g., byteArray[0]) convert engine 140 calls a proprietary class function, implemented by the IL2J compiler to support unsigned arrays, to get the value. For example, the expression byteArray[0] is replaced with the Java expression byteArray.getValue(0).

As another example, the J2IL compiler uses wrapper classes with static methods (a.k.a. static wrapper classes) to handle basic types common to .Net® and Java. These types include System.Object (=java.lang.Object) & System.String (=java.lang.String). Once the program code tries to call a method of one of these classes, convert engine 140 identifies the correct wrapper class and replaces the method use with a use of the appropriate static method of the wrapper class. For instance, the expression str.GetLength() is replaced with the expression StringStaticWrapper.GetLength(str). It should be noted by a person skilled in the art that these examples are intended for purposes of demonstration only and are not intended to limit the scope of the disclosed invention.

At step S260, convert engine 140 constructs a Java expression from the expression elements. In one exemplary embodiment of the present invention the expression elements may be constructed as an ASCII expression. At step S270, the Java expression is sent to Java debugger 170 through JDI 130 for evaluation. At step S280, Java debugger 170 returns the evaluation results to JDI 130. These results use are used by convert engine 130 to translate the results to a format compliant with the .Net®, if needed. For example, if the expression 'd' is an instance of a class, then the value field of the expression evaluation windows includes the runtime type of 'd' enclosed in brackets. Java debugger 170, in this case, outputs the Java runtime type, which is subsequently translated into a .Net® runtime type. For example, the type java.lang.String is replaced with the expression System.String. The evaluation results are sent to IDE 180 tool, which displays them to the user.

In one embodiment of the present invention, the evaluated expressions are displayed in the expression windows of the Visual Studio®, e.g., the Watch, Autos, Local, and This/Me windows. To support the expression's evaluation through the expression windows, additional steps have to be taken. Specifically, to display evaluated local variables, in the Locals window in the current context, the method disclosed further: a) retrieves a list of local variables names from the PDB files and a list including their types from the DLL files; b) combines the two lists into a single list; c) converts the variables names in the list to Java compliant names; and, d) sends the converted list to Java debugger 170 for evaluation.

Evaluation results are displayed in the Locals window. To display variables used in the current statement (one or more per code line) and the previous statement in the Autos window, the method for evaluating expressions is called, for each variable in the current and previous statements. To display object elements pointed to by the 'this' pointer (or the 'me' object in Visual Basic) in the This/Me window, the method further: a) finds the class in the current context; b) evaluates the class objects using Java debugger 170; and, c) displays the evaluation results. Expressions in the Watch windows are handled by the method for evaluating expressions, as described in greater detail hereinabove.

The present invention allows the expansion of expressions in any expression window. To facilitate this ability, the type of the expression is found and its members (i.e., fields and properties) are identified. For each field and property a tree representation is created, which is then converted into a Java expression, as described in greater detail hereinabove.

Figure 4:
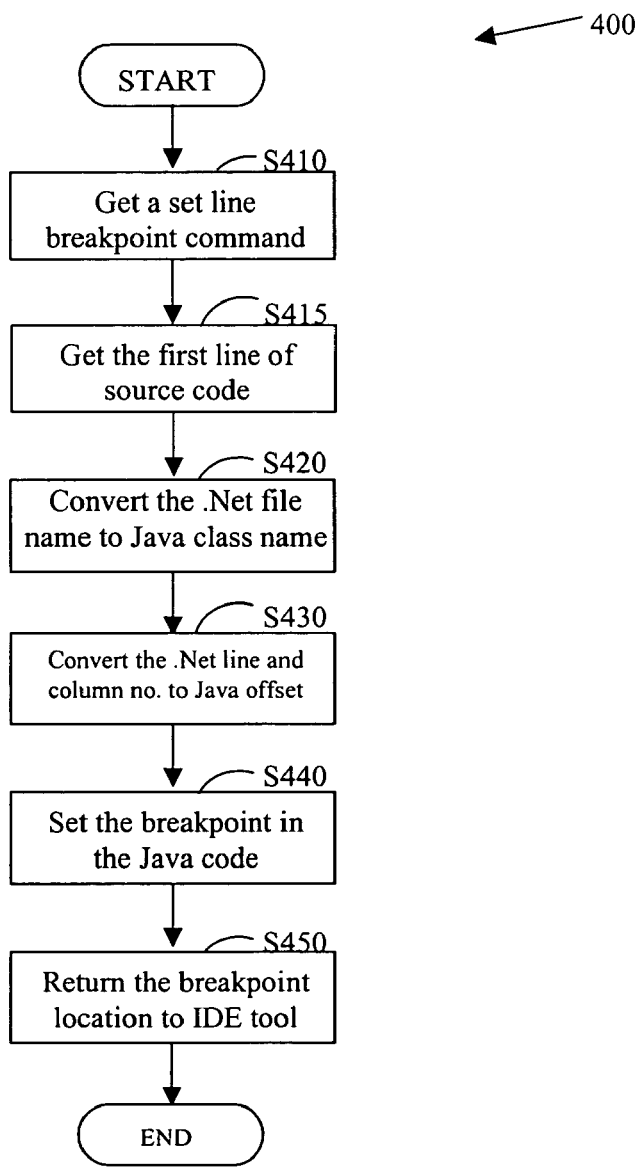
FIG. 4 is a flowchart describing the method for handling breakpoints, constructed in accordance with an exemplary embodiment of the present invention.

FIG. 4 is a non-limiting flowchart 400 describing a method for handling breakpoints in accordance with an exemplary embodiment of the present invention. Debugger 100 is designed to stop at one or more types of breakpoints set in the program code. These types of breakpoints include, but are not limited to, a line breakpoint, a function breakpoint, a conditional breakpoint and others. The user sets a line breakpoint in the .Net® program code and debugger 100 finds the precise location in the Java code. At step S410, a command to set a line breakpoint and its parameters are received at IDE interface 110. The command parameters include at least the .Net® file name, line number and column number (in the .Net® file) to set the breakpoint. Additional parameters may be provided according to the type of the breakpoint to be set.

At step S415, convert engine 140 uses the debug information to calculate the closest code line that is actually a source code. For example, if the user sets the breakpoint in a commented out code line, convert engine 140 will find the next closest line that is not commented out. At step S420, convert engine 140 translates the .Net® file and source line number to a Java class name using the debug information. At step S430, convert engine 140 converts the .Net® line and column number to a Java line and offset, i.e., to the code position within a method. At step S440, the Java class name, line number and Java offset are sent to Java debugger 170, which sets the breakpoint accordingly. At step S450, the breakpoint location is returned to IDE tool 180 for the purpose of displaying the breakpoint mark in the correct location in the .Net® source code.

To handle function breakpoints, the command parameters include the function name, and may include the class name and a list of the function's arguments as specified by the user through IDE tool 180. Convert engine 140 locates the class name (if specified) and the function name in that class. This function should match the arguments specified in the input parameters. Then, convert engine 140 converts the input parameters to their format in Java code, i.e., Java class name, method name and arguments. In some cases the functions' names or the class names are modified by the IL2J complier, when generating Java bytecodes. If the class name is not provided in the input parameters, convert engine 140 searches the requested function in the current class. Likewise, if the list of arguments is not provided, convert engine 140 finds all the overloaded functions with the same name and sets a breakpoint in each one of them.

A conditional breakpoint is a line or function breakpoint with an additional condition. Conditional breakpoints operate the same way as line or function breakpoints, except that when execution arrives at a conditional breakpoint, it does not break unless the specified condition is satisfied. To set a conditional breakpoint, the condition expression is received as an input in addition to the line or function breakpoint parameters. The location of the breakpoint (i.e. the Java class name, line number and Java offset) is identified as described above. The condition is translated to a Java expression using the method for evaluating expressions described in greater detail above. When execution arrives at this location, the Java condition expression is evaluated in order to determine whether to stop.

Figure 5:
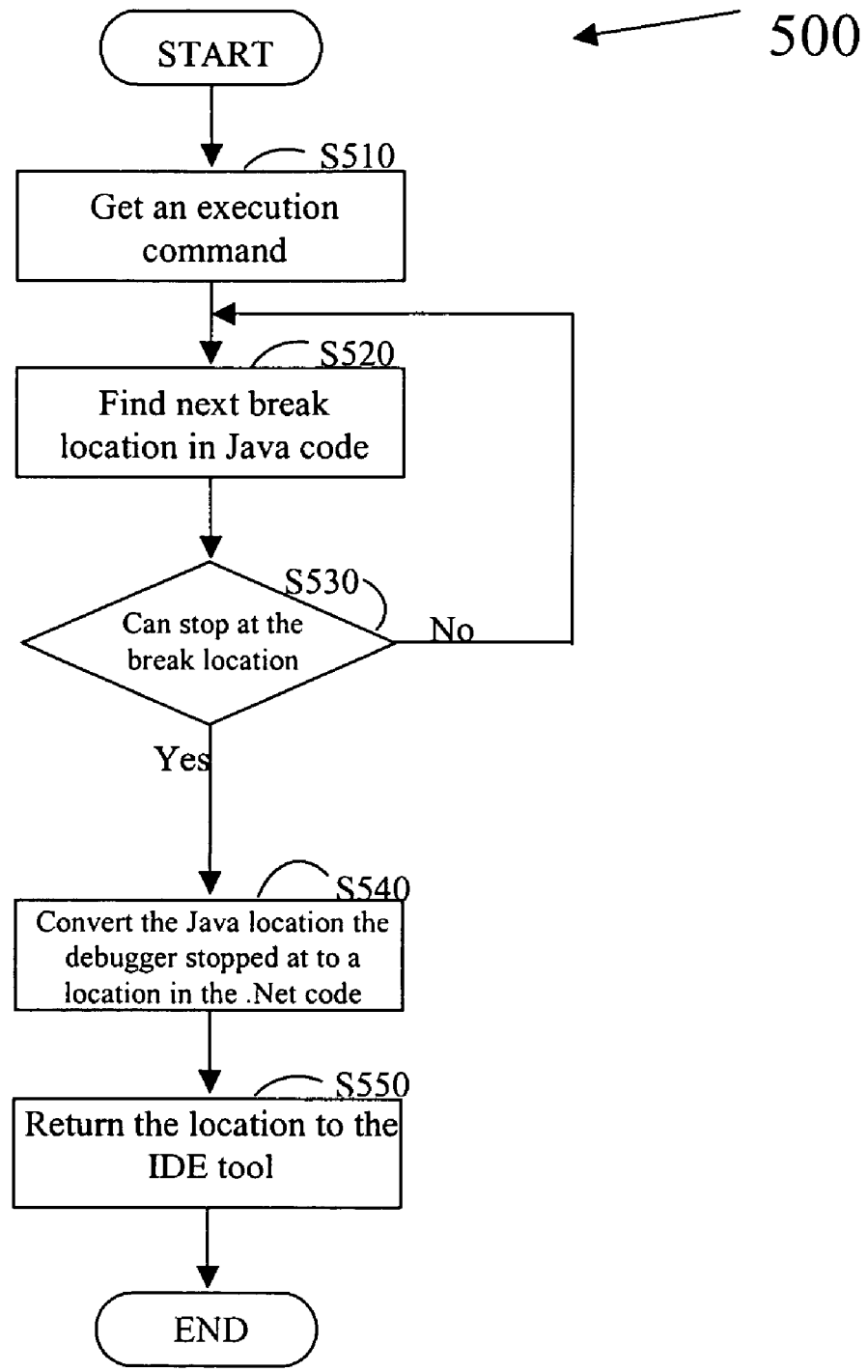
FIG. 5 is a flowchart describing the method for controlling the execution flow of the debugger, constructed in accordance with an exemplary embodiment of the present invention.

FIG. 5 is a non-limiting flowchart 500 describes a method for controlling the execution flow of the debugger, in accordance with an exemplary embodiment of the present invention. When compiling a .Net® program into Java bytecodes, code lines are added to the program code. During debugging, debugger 100 should preferably not break at the locations of these additional code lines. Thus the method detects these additional lines and bypasses them. At step S510, the execution command to be performed is received as an input at IDE interface 110. An execution command may be, but is not limited to, step into, next, step out and others.

At step S520, the next break location to stop at in the Java source code is identified. At step S530, a check is performed to determine if the break location is a code line added at compilation time. If so, execution command is performed again, i.e., the method continues with S520. If, at step S530, it is determined that Java debugger 170 can stop at the break location, execution continues with step S540. Thus, at step 540, the break location, i.e., the line number and Java offset where Java debugger 170 stopped, is converted into .Net® location information. This information includes the file name, begin and end line, as well as begin and end columns. This information is deduced from the line and Java offset. The conversion is performed once the execution of the input execution command is completed. At step S560, the .Net® location information is returned back to IDE tool 180 via IDE interface 110.

In accordance with one embodiment of the present invention, debugger 100 is capable of displaying the stack frame information. In this embodiment, debugger 100 receives a command to display the stack frame information from IDE tool 180, which is subsequently executed by Java debugger 170. The frame stack information generated by Java debugger 170 is sent to convert engine 140, which translates it from Java to .Net®. This includes translating class names, function names and argument types and their values from a Java compliant format to a .Net® compliant format. Also, the break location, i.e., line number and Java offset is converted into .Net® location information. This information includes the file name, begin and end lines, as well as begin and end columns. The translation is performed only for frames that originate from a .Net® language source code. The frame stack information generated by convert engine 140 is then returned to IDE tool 180.

It is to be understood that the phraseology and terminology employed herein are for the purpose of description, and should not be regarded as limiting.

It is important, therefore, that the scope of the invention is not construed as being limited by the illustrative embodiments set forth herein. Other variations are possible within the scope of the present invention as defined in the appended claims and their equivalents.

We claim:

1. A debugging apparatus including a processor capable of executing a process of debugging a computer program across multiple programming languages, wherein the debugging is performed on .Net platform source code of the computer program, while the computer program is executed within a Java runtime environment, the debugger comprising:

an integrated development environment (IDE) interface capable of interfacing with at least one IDE tool for the purpose of receiving a plurality of debugging commands, each having at least one parameter;

a debug engine capable of determining a current breakpoint location in said source code;

a Java debugger interface (JDI) capable of communicating with at least one Java debugger;

a convert engine capable of converting said at least one parameter of each of said debugging commands from a .Net compliant format to a Java compliant format, said convert engine being further capable of converting said debugging commands from said Java compliant format in Java source code to said .Net compliant format;

an expression evaluator capable of at least parsing said at least one parameter to derive atomic elements of expressions written in a .Net compliant format; and a debug information repository at least comprising debug information, wherein said convert engine determines for each atomic element a type of a responsive .Net expression and further transforms each atomic element into a Java programming language compliant format to bridge the semantic differences between .Net programming languages and Java programming language wherein said atomic element is at least of one of an operator and an operand;

wherein the debugging apparatus if further capable of:

performing said debugging command with the converted parameters using a Java debugger and a Java runtime environment;

converting the debugging results returned by said Java debugger from said Java source code to .Net source code; and, returning the converted debugging results to said IDE tool, wherein the debugging is performed at a source level of the computer program written in any programming language supported by the .Net platform.

2. The debugging apparatus of claim 1, wherein said .Net® source code is written using at least one of the following programming languages: C++ with managed extensions; C-sharp (C#); Visual Basic; Pascal; and COBOL.

3. The debugging apparatus of claim 1, wherein said Java runtime environment comprises at least one of: a Java virtual machine (JVM); and a Java 2 platform enterprise edition (J2EE) server.

4. The debugging apparatus of claim 1, wherein said IDE tool is at least the Microsoft Visual Studio® for .Net®.

5. The debugging apparatus of claim 1, wherein each of said plurality of debugging commands is at least one of: a breakpoint command; an execution command; an evaluation command; and a stack frame information command.

6. The debugging apparatus of claim 5, wherein the command parameters of said evaluation command comprise at least a .Net® expression.

7. The debugging apparatus of claim 6, wherein said .Net® expression is at least one of: an identifier; a literal; an operator; a function call; and a variable.

8. The debugging apparatus of claim 6, wherein said expression evaluator is further capable of generating a tree representation of said parsed .Net® expression.

9. The debugging apparatus of claim 8, wherein said tree representation comprises at least one atomic element of said parsed .Net® expression.

10. The debugging apparatus or claim 9, wherein the data type of each of said atom elements is determined using said debug information.

11. The debugging apparatus of claim 1, wherein said convert engine further constructs a Java expression from said atomic elements converted to Java.

12. The debugging apparatus of claim 11, wherein said Java expression is sent to said Java debugger for evaluation.

13. The debugging apparatus of claim 12, wherein said evaluation results are returned to said IDE tool.

14. The debugging apparatus of claim 13, wherein said evaluation results are displayed in at least one expression window of the Microsoft Visual Studio® for .Net®.

15. The debugging apparatus of claim 14, wherein said expression window comprises at least one of: Watch; Locals; This/Me; and Autos.

16. The debugging apparatus of claim 5, wherein said execution command comprises at least one of: stepping into a code line in the Java source code; and moving to a next code line in said Java source code.

17. The debugging apparatus of claim 16, wherein the code line to stop at is determined by said convert engine.

18. The debugging apparatus of claim 5, wherein said stack frame information command comprises displaying stack frame information generated by said Java debugger over said IDE tool.

19. The debugging apparatus of claim 18, wherein displaying said stack frame information further comprises the step of translating said stack frame information generated by said Java debugger to said .Net® compliant format.

20. The debugging apparatus of claim 18, wherein said stack frame information comprises at least one of: a class name; a function name; a list of arguments; the type of each of said arguments; and the value of each of said arguments.

21. The debugging apparatus of claim 1, wherein said debug information is extracted from at least one of: program database (PDB) files; dynamically linked library (DLL) files; and extensible markup language (XML) files.

22. The debugging apparatus of claim 2, wherein said expression evaluator comprises a plurality of parsers, wherein each of said parsers is designed to parse one of the .Net® programming languages.

23. A method for debugging a computer program across multiple programming languages, wherein the debugging is performed on .Net® platform source code of the computer program, while the computer program is executing within a Java runtime environment, said method comprising:
   providing an integrated development environment (IDE) interface capable of interfacing with at least one IDE tool for the purpose of receiving a plurality of debugging commands, each having at least one parameter;
   providing a debug engine capable of determining a current breakpoint location in the source code;
   providing a Java debugger interface (JDI) capable of communicating with at least one Java debugger;
   providing a convert engine capable of converting said at least one parameter of each of said debugging commands from a .Net compliant format to a Java compliant format, said convert engine being further capable of converting said debugging commands from said Java compliant format in Java source code to said .Net compliant format;
   providing an expression evaluator capable of at least parsing said at least one parameter to derive atomic elements of expressions written in a .Net compliant format; and,
   providing a debug information repository at least comprising debug information,
   receiving a debugging command in a .Net compliant format from an integrated development environment (IDE) tool;
   determining, using the atomic elements, a .Net expression the type of the .Net expression, wherein each of the atomic elements is at least one of an operator and an operand;
   converting the atomic elements of said .Net expressions into a Java compliant format to bridge the semantic differences between .Net programming languages and Java programming language;
   performing said debugging command with the converted parameters using a Java debugger and a Java runtime environment;
   converting the debugging results returned by said Java debugger from said Java source code to .Net source code; and,
   returning the converted debugging results to said IDE tool, wherein the debugging is performed at a source level of the computer program written in any programming language supported by the .Net platform.

24. The method of claim 23, wherein said computer program comprises a .Net® source code written using at least one of the following programming languages: C++ with managed extensions; C-sharp (C#); Visual Basic; Pascal; and COBOL.

25. The method of claim 23, wherein said Java runtime environment comprises at least one of: a Java virtual machine (JVM); and a Java 2 platform enterprise edition (J2EE) server.

26. The method of claim 23, wherein said IDE tool is at least the Microsoft Visual Studio® for .Net®.

27. The method of claim 23, wherein said debugging command is at least one of: a breakpoint command; execution command; an evaluation command; and a stack frame information command.

28. The method of claim 27, wherein the command parameters of said evaluation command comprise at least a .Net® expression.

29. The method of claim 28, wherein said .Net® expression is at least one of: an identifier; a literal; an operator; a function call; and a variable.

30. The method of claim 27, wherein said breakpoint command comprises setting and converting of at least one of the following parameters: a line breakpoint; a function breakpoint; and a conditional breakpoint.

31. The method of claim 30, wherein converting the parameters of said breakpoint command is followed by translating a .Net® location of a breakpoint to a Java location.

32. The method of claim 31, wherein said .Net® location is determined using at least: a .Net® file name; a line number; and a column number.

33. The method of claim 31, wherein said Java location is determined using at least: a Java class name; a line number; and a Java offset.

34. The method of claim 31, wherein said Java location is returned to said IDE tool.

35. The method of claim 28, further comprising:
   constructing a tree representation from said atomic elements of said .Net® expression; and,
   constructing a Java expression from said atomic elements of said .Net® expression.

36. The method of claim 35, further comprising evaluating said Java expression to provide debugging evaluation results.

37. The method of claim 36, wherein said debugging results are said evaluation results returned by said Java debugger.

38. The method of claim 37, wherein said evaluation results are displayed by said IDE tool.

39. The method of claim 38, wherein said evaluation results are displayed in at least one expression window of the Microsoft Visual Studio® for .Net®.

40. The method of claim 39, wherein said expression window comprises at least one of: Watch; Locals; This/Me; and Autos.

41. The method of claim 35, wherein the data type of each of said atomic elements is determined using debug information.

42. The method of claim 32, wherein said breakpoint command comprises setting of at least one of the following breakpoints: a line breakpoint, a function breakpoint, and a conditional breakpoint.

43. The method of claim 33, wherein the step of performing said debugging command further comprises setting a breakpoint at said Java location in said Java source code.

44. The method of claim 43, wherein said debugging results comprise said Java location.

45. The method of claim 43, wherein said execution command comprises at least one of: stepping into a code line in said Java source code; and moving to a next code line in said Java source code.

46. The method of claim 45, wherein the step of performing said debugging command further comprises:
   determining a next break location in said Java source code; and
   checking if said Java debugger can stop at said next break location, and if so said Java debugger breaks at said next break location; otherwise, repeating said determining a next break location step.

47. The method of claim 46, wherein the step of converting said debugging results further comprises translating said Java break location to a .Net location.

48. The method of claim 47, wherein said .Net® location is determined using at least: .Net file name; line number; and column number.

49. The method of claim 45, wherein the step of performing said debugging command comprises generating said stack frame information by said Java debugger.

50. The method of claim 49, wherein the step of converting said debugging results further comprises translating said stack frame information generated by said Java debugger to .Net® compliant format.

51. The method of claim 50, wherein the .Net® compliant format of said stack frame information is displayed in said IDE tool.

52. The method of claim 49, wherein said stack frame information comprises at least one of: class name; function name; list of arguments; the type of each of said argument; and the value of each of argument.

53. A computer-readable medium having stored thereon computer executable code for debugging a computer program across multiple programming languages, wherein the debugging is performed on .Net platform source code of the computer program, while the computer program is executing within a Java runtime environment, comprising:
    providing an integrated development environment (IDE) interface capable of interfacing with at least one IDE tool for the purpose of receiving a plurality of debugging commands, each having at least one parameter;
    providing a debug engine capable of determining a current breakpoint location in the source code;
    providing a Java debugger interface (JDI) capable of communicating with at least one Java debugger;
    providing a convert engine capable of converting said at least one parameter of each of said debugging commands from a .Net compliant format to a Java compliant format, said convert engine being further capable of converting said debugging commands from said Java compliant format in Java source code to said .Net compliant format;
    providing an expression evaluator capable of at least parsing said at least one parameter to derive atomic elements of expressions written in a .Net compliant format;
    providing a debug information repository at least comprising debug information;
    receiving a debugging command in a .Net compliant format from an integrated development environment (IDE) tool;
    determining, using the atomic elements, a .Net expression the type of the .Net expression, wherein each of the atomic elements is at least one of an operator and an operand;
    converting the atomic elements of said .Net expressions into a Java compliant format to bridge the semantic differences between .Net programming languages and Java programming language;
    performing said debugging command with the converted parameters using a Java debugger and a Java runtime environment;
    converting the debugging results returned by said Java debugger from said Java source code to .Net source code; and
    returning the converted debugging results to said IDE tool, wherein the debugging is performed at a source level of the computer program written in any programming language supported by the .Net platform.

54. The computer program product of claim 53, wherein said computer program comprises a .Net® source code written using at least one of the following programming languages: C++ with managed extensions; C-sharp (C#); Visual Basic; Pascal; and COBOL.

55. The computer program product of claim 53, wherein said Java runtime environment comprises at least one of: a Java virtual machine (JVM); and Java 2 platform enterprise edition (J2EE) server.

56. The computer program product of claim 53, wherein said IDE tool is at least the Microsoft Visual Studio for .Net®.

57. The computer program product of claim 53, wherein said debugging command is at least one of: a breakpoint command; an execution command; an evaluation command; and a stack frame information command.

58. The computer program product of claim 57, wherein the command parameters of said evaluation command comprise at least a .Net® expression.

59. The computer program product of claim 57, wherein said .Net® expression is at least one of: an identifier; a literal; an operator; a function call; and a variable.

60. The computer program product of claim 58, wherein the step of converting said parameters of said plurality of debugging command further comprises:
    constructing a tree representation from said atomic elements of said .Net® expression; and,
    constructing a Java expression from said atomic elements of said .Net® expression.

61. The computer program product of claim 60, further comprising evaluating said Java expression.

62. The computer program product of claim 61, wherein said debugging results are evaluation results returned by said Java debugger.

63. The computer program product of claim 62, wherein said evaluation results are displayed in said IDE tool.

64. The computer program product of claim 63, wherein said evaluation results are displayed in at least one expression window of the Microsoft Visual Studio® for .Net®.

65. The computer program product of claim 64, wherein said expression window comprises at least one of: Watch; Locals; This/Me; and Autos.

66. The computer program product of claim 60, wherein the data type of each of said atomic elements is determined using debug information.

67. The computer program product of claim 57, wherein said breakpoint command comprises setting at least one of the following breakpoints: a line breakpoint; a function breakpoint; and a conditional breakpoint.

68. The computer program product of claim 67, wherein the command parameters comprise a .Net® location of a breakpoint.

69. The computer program product of claim 68, wherein said .Net® location is determined using at least: a .Net® file name; a line number; and a column number.

70. The computer program product of claim 68, wherein the step of converting said parameters of said plurality of debugging command further comprises translating said .Net® location of a breakpoint to a Java location.

71. The computer program product of claim 70, wherein said Java location is determined using at least: a Java class name; a line number; and a Java offset.

72. The computer program product of claim 71, wherein the step of performing said debugging command further comprises
    setting a breakpoint at said Java location in the Java source code.

73. The computer program product of claim 70, wherein said debugging results comprise said Java location.

74. The computer program product of claim 72, wherein said execution command comprises at least one of: stepping into a code line in the Java source code; and moving to a next code line in the Java source code.

75. The computer program product of claim 74, wherein the step of performing said debugging command further comprises:
  determining a next break location in the Java source code; and
  checking if said Java debugger can stop at said next break location, and if so said Java debugger breaks at said next break location; otherwise, repeating said determining a next break location step.

76. The computer program product of claim 75, wherein the step of converting said debugging results further comprises
  translating said Java break location to a .Net® location.

77. The computer program product of claim 76, wherein said .Net® location is determined using at least: a .Net® file name; a line number; and a column number.

78. The computer program product of claim 76, wherein the step of performing said debugging command further comprises
  generating said stack frame information by said Java debugger.

79. The computer program product of claim 78, wherein the step of converting said debugging results further comprises translating said stack frame information generated by said Java debugger to said .Net® compliant format.

80. The computer program product of claim 79, wherein the .Net® compliant format of said stack frame information is displayed in said IDE tool.

81. The computer program product of claim 78, wherein said stack frame information comprises at least one of: a class name; a function name; a list of arguments; the type of each of said arguments; and the value of each of said arguments.

82. A method for evaluating an expression when debugging a computer program across multiple programming languages, wherein the debugging is performed on .Net source code of the computer program, while the computer program is executing within a Java runtime environment, said method comprising:
  providing an integrated development environment (IDE) interface capable of interfacing with at least one IDE tool for the purpose of receiving a plurality of debugging commands, each having at least one parameter;
  providing a debug engine capable of determining a current breakpoint location in the source code;
  providing a Java debugger interface (JDI) capable of communicating with at least one Java debugger;
  providing a convert engine capable of converting said parameters of each of said debugging commands from a .Net compliant format to a Java compliant format, said convert engine being further capable of converting said debugging commands from said Java compliant format in Java source code to said .Net compliant format;
  providing an expression evaluator capable of at least parsing said parameters; and,
  providing a debug information repository at least comprising debug information,
  receiving at least a .Net expression to be evaluated from an integrated development environment (IDE) tool;
  determining a current break location in a .Net source code;
  parsing said .Net expression into at least one atomic element;
  generating a tree representation from said atomic elements;
  determining the data type of each of said at least one atomic elements, wherein each of the atomic elements is at least one of an operator and an operand;
  traversing said tree representation for the purpose of determining the data type of said .Net expression;
  converting each atomic element to a format compliant with said at least one Java debugger to bridge the semantic differences between .Net programming languages and Java programming language;
  constructing a Java expression from said atomic elements converted to a Java compliant format; and,
  evaluating said Java expression using said at least one Java debugger and a Java runtime environment to provide evaluation results.

83. The method of claim 82, further comprising:
  returning said evaluation results to said IDE tool; and
  displaying said evaluation results in said IDE tool.

84. The method of claim 82, wherein said .Net® source code is written using at least one of the following programming languages: C++ with managed extensions; C-sharp (C#); Visual Basic; Pascal; and COBOL.

85. The method of claim 82, wherein said IDE tool is at least the Microsoft Visual Studio® for .Net®.

86. The method of claim 82, wherein said evaluation results are displayed in at least one expression window of said Microsoft Visual Studio® for .Net®.

87. The method of claim 86, wherein said expression window comprises at least one of: Watch; Locals; This/Me; and Autos.

88. The method of claim 82, wherein the data type of each of said atomic elements is determined using debug information.

89. The method of claim 82, wherein said .Net® expression comprises at least one of: an identifier; a literal; an operator; a function call; and a variable.

90. A computer readable medium having stored thereon computer executable code for evaluating at least an expression when debugging a computer program across multiple programming languages, wherein the debugging is performed on .Net source code of the computer program, while the computer program is executing within a Java runtime environment, comprising:
  providing an integrated development environment (IDE) interface capable of interfacing with at least one IDE tool for the purpose of receiving a plurality of debugging commands, each having at least one parameter;
  providing a debug engine capable of determining a current breakpoint location in the source code;
  providing a Java debugger interface (JDI) capable of communicating with at least one Java debugger;
  providing a convert engine capable of converting said parameters of each of said debugging commands from a .Net compliant format to a Java compliant format, said convert engine being further capable of converting said debugging commands from said Java compliant format in Java source code to said .Net compliant format;
  providing an expression evaluator capable of at least parsing said parameters;
  providing a debug information repository at least comprising debug information;
  receiving from an integrated development environment (IDE) tool at least a .Net expression to be evaluated;
  determining current break location in the .Net source code;
  parsing said .Net expression into atomic elements;
  generating a tree representation from said atomic elements;

determining the data type of each of said atomic elements, wherein each of the atomic elements is at least one of an operator and an operand;

traversing said tree representation for the purpose of determining the data type of said .Net expression;

converting each of said atomic elements to a format compliant with a Java debugger to bridge the semantic differences between .Net programming languages and Java programming language;

constructing a Java expression from said converted atomic elements to a Java compliant format; and evaluating said Java expression using a Java debugger and a Java runtime environment to provide evaluation results.

91. The computer program product of claim 90, further comprising:

returning said evaluation results to said IDE tool; and displaying said evaluation results in said IDE tool.

92. The computer program product of claim 90, wherein said .Net® source code is written using at least one of the following programming languages: C++ with managed extensions; C-sharp (C#); Visual Basic; Pascal; and COBOL.

93. The computer program product of claim 90, wherein said IDE tool is at least the Microsoft Visual Studio for .Net®.

94. The computer program product of claim 90, wherein said evaluation results are displayed in at least one expression window of said Microsoft Visual Studio® for .Net®.

95. The computer program product of claim 90, wherein said expression window comprises at least one of: Watch; Locals; This/Me; and Autos.

96. The computer program product of claim 90, wherein the data type of each of said atoms is determined using debug information.

97. The computer program product of claim 90, wherein said .Net® expression comprises at least one of: an identifier; a literal; an operator; a function call; and a variable.

* * * * *